United States Patent [19]

Tseng et al.

[11] Patent Number: 5,625,416

[45] Date of Patent: Apr. 29, 1997

[54] VIDEO COMMUNICATION CONTROLLER UTILIZING MULTIPLE DATA CHANNELS TO DELIVER SEPARATE PROGRAM SEGMENTS

[76] Inventors: Ling-yuan Tseng, 13772 Calle Tacuba, Saratoga, Calif. 95070; Sheng-wen Hong, 4th Floor, No. 11, Lane 47, Kuang Hwei Road, Mu-cha, Taipei, Taiwan

[21] Appl. No.: 160,426

[22] Filed: Dec. 1, 1993

Related U.S. Application Data

[63] Continuation-in-part of Ser. No. 123,299, Sep. 17, 1993.

[51] Int. Cl.$^6$ ................................................. H04N 7/10
[52] U.S. Cl. .................... 348/388; 348/6; 348/13
[58] Field of Search ............................... 348/6, 10, 12, 348/13, 14, 15, 16, 17, 18, 19, 388; 379/96, 53, 54; H04N 7/10, 7/12, 7/14

[56] References Cited

U.S. PATENT DOCUMENTS

| | | | |
|---|---|---|---|
| 4,907,079 | 3/1990 | Turner et al. | 358/84 |
| 4,947,250 | 8/1990 | Henderson | 348/592 |
| 4,991,201 | 2/1991 | Tseng | 379/100 |
| 5,023,934 | 6/1991 | Wheeless | 455/45 |
| 5,115,309 | 5/1992 | Hang | 348/388 |
| 5,212,579 | 5/1993 | Huber et al. | 359/182 |

*Primary Examiner*—Michael Lee
*Assistant Examiner*—Nathan J. Flynn
*Attorney, Agent, or Firm*—Gifford, Krass, Groh, Sprinkle, Patmore, Anderson & Citkowski

[57] ABSTRACT

A module containing digital compression and decompression circuitry is used in conjunction with a system whereby a video program may be communicated over a telephone line to an RF broadcaster to be received by individuals at remote locations equipped with one of the modules. In the preferred embodiment, the RF transmitter is an FM transmitter, and the video broadcasts are modulated onto a subcarrier, such as an SCA subcarrier. The module has various other inputs and outputs adapted for connection to other video-related devices and/or a personal computer which may be used for control or program production. A configuration is also described whereby multiple modules may be used in conjunction with a conference control module enabling multiple participants to view one another as part of a gathering such as a classroom instruction situation.

17 Claims, 4 Drawing Sheets

VIDEO COMMUNICATION CONTROLLER UTILIZING MULTIPLE DATA CHANNELS TO DELIVER SEPARATE PROGRAM SEGMENTS

RELATED APPLICATIONS

This is a continuation-in-part of co-pending U.S. Ser. No. 08/123,299, filed Sep. 17, 1993.

FIELD OF THE INVENTION

The present invention relates generally to video program distribution and, in particular, to apparatus and methods whereby video programs may be communicated over a telephone line and broadcast on an FM subcarrier.

BACKGROUND OF THE INVENTION

There has been a proliferation of consumer-oriented video equipment, including video cameras, tape recorders and televisions which function as video monitors. As the capabilities of such VCR equipment have improved in recent years, so has consumer sophistication, and many individuals now produce video programming on their own. This, in turn, has led to a dramatic reduction in the cost of such equipment, which has further encouraged the production of video programs by consumers.

At the same time, digital data compression techniques have become increasingly effective, allowing data in many forms to be stored and transmitted with substantially reduced bandwidth requirements. Video programs are particularly conducive to digital compression techniques, since much of the information is repetitive on a frame-by-frame basis. Many standards are emerging with respect to video compression and decompression, including the currently available MPEG (Motion Picture Entertainment Group) standard, which affords orders of magnitude compression of a video signal.

A reduction in video data requirements opens up significant new opportunities in the area of program distribution, since lower-grade bandwidth communication channels, including voice channels, may be utilized for the distribution of picture-containing material. More specifically, whereas high bandwidth media such as fiber optic channels, RF and microwave lengths were previously necessary for image communication, with data compression motion picture image transmission is now possible over standard telephone lines.

With standard voice communication channels capable of supporting video image transmissions, it is increasingly desirable for consumers to send and receive video program materials. If two locations remote from one another are each equipped with a camera, monitor and appropriate compression/decompression electronics, it becomes possible for these individuals to look at one another during a voice communication. Such technology forms the basis of the video phones or picture phones which are now gaining in popularity.

Along with the possibility of sending and receiving video program material via phone line, RF channels previously suitable only for voice-related broadcasts, may also be used for the purpose of sending and receiving a video image. For example, radio frequencies, with bandwidths in the kilohertz range, may be capable of supporting the distribution of video images if such images are sufficiently compressed. However, as with television RF broadcasting, radio operator licenses are expensive and limited so as to avoid interference in a given geographical area. Therefore, even with the ability to transmit and receive video images over channels previously suitable only to voice-grade communications, there remains a need whereby more video program providers may reach a wider audience beyond restrictions imposed by FCC regulations.

SUMMARY OF THE INVENTION

The present invention enables an increased number of video program providers to reach a much greater audience by transmitting such video program material over the subcarrier of a radio broadcast, preferably the SCA side band of an FM transmission. In accordance with the apparatus aspect of the present invention, a module is provided which accepts video program material, digitized it if necessary, and compresses that material so that it may be transmitted over a voice-grade channel such as a conventional telephone line. The program material is sent to a radio station and broadcast over a radio subcarrier. The module also includes a radio receiver that can tune and demodulate the subcarrier, then decompress the compressed video signal so that it may be displayed on a monitor, including a conventional television receiver.

In its most basic form, a single program provider in a given geographical area may transmit video programs to a radio station on an unattended basis to be received by a limited number of recipients having similar video communications controllers. However, a service center may be included in conjunction with the radio transmitter, in which case multiple video programs may be received by a plurality of program providers, with the center collecting and scheduling these broadcasts. The center may also be responsible for encrypting certain of the programs and collecting fees from recipients on a subscriber basis in order to take advantage of the program material.

Since the video communication controller is equipped with digital decompression circuitry, the system may also receive video program material over the public switch telephone network, thus enabling two individuals equipped with a controller to use their video cameras, telephone interfaces and television monitors as video phones. Furthermore, with the ability to send and receive video images through the public switch telephone network as well as through a radio subcarrier, various interactive video arrangements are possible. For example, in an educational environment, an instructor may broadcast lessons over a radio subcarrier while receiving student questions, including video images of the students asking the questions via a telephone interface. With such a setup, a time-division multiplexer is preferably added so that the various students may appear in "windows" of the broadcast lesson.

The method aspect of the invention describes steps whereby video program material is produced, digitized, compressed, transmitted, decompressed and displayed. To enhance image quality, or to maintain image quality over a relatively low bandwidth medium, the method further describes a technique whereby a video image may be segmented into one or more segments containing video and/or audio information, separately digitized, compressed and transmitted to a service center, then reassembled at the service center for broadcast over a radio subcarrier.

The video program may also be received at a radio broadcast facility in segmented form or segmented at the broadcast facility and transmitted over separate frequencies or subcarriers, in the event that higher quality or higher resolution image and/or sound are desired through a given RF transmission medium. In a preferred embodiment of this alternative, audio information may be transmitted over a 57 kHz SCA side band, with the video information being split between a 67 kHz and a 92 kHz side band, all these side bands being authorized by the FCC for a given FM frequency. Other frequencies and/or side bands may alternatively be utilized, and operations such as digitization, compression and encryption may occur at virtually any point along the route from program production to transmission, and these operations may vary depending upon whether audio or video information is being handled, whether encryption is used, and so forth.

DETAILED DESCRIPTION OF THE PREFERRED EMBODIMENT

Figure 1:
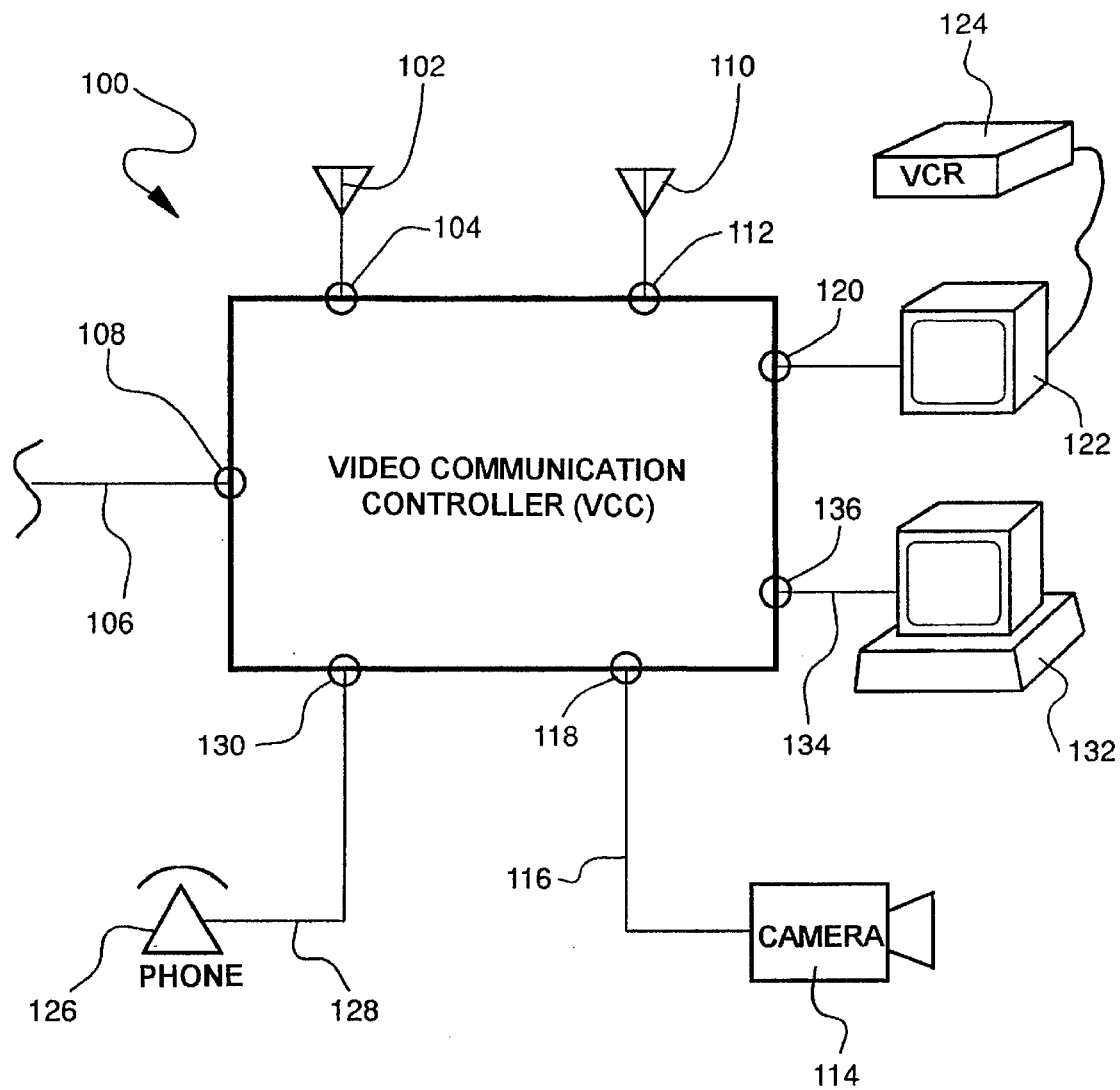
FIG. 1 is a block diagram of a video communication controller illustrating connections to various electronic subsystems.

In FIG. 1, there is shown the block diagram of a video communication controller ("VCC") interconnected in accordance with the present invention. Broadly speaking, a module, depicted generally at 100, allows digitally compressed video programming to be received either by way of an RE signal through an antenna 102, making connection to the module 100 at 104, or by way of a telephone line 106, making connection at point 108. A television antenna 110 may also be provided, making connection at 112, to serve as another means for receiving video programming, though not necessarily in digital or compressed form. Alternatively, antennas 102 and 110 may be replaced by a single antenna if it is sufficiently broad band in design.

The basic VCC also enables a source of outgoing video programming to be digitized, if necessary, and compressed so that it may be output over telephone line 106 to be received by another VCC, either directly over the telephone line or as an RF signal, when decompressed and displayed. To be received as an RF signal, the VCC interface to the source of outgoing video programming communicates via phone line to a radio transmitter, which broadcasts the outgoing video programming, preferably on an FM sub-carrier. Communication with the radio transmitter is discussed in more detail in subsequent sections.

To provide a source of outgoing video programming, several commercially available devices may be used, such as a video camera or camcorder 114, which connects to module via cable 116 connected at point 118. Since advanced video-related devices such as camcorders also include internal video tape recorders, the same device may be used for the receipt of incoming video programming, either through the same connector or through a different connector, depending on overall system configuration and programming.

A video output connector 120 is connected to a television set or a video monitor 122, which is used to display incoming video programs. A separate video tape recorder or video cassette recorder 124 may alternatively be interfaced to the television set, thus enabling an operator to record incoming video programs which may be viewed or re-broadcast as outgoing video material in accordance with user desire. A telephone set 126 is optionally connected to module 100 by means of line 128 and connector 130, the function of the telephone being conventional voice communications, including the dialing of recipients of outgoing video programming generated by a VCC such as module 100.

A personal computer 132 may also optionally be interconnected to VCC 100 over a cable 134 connected at point 136. Such a computer may afford numerous capabilities with respect to VCC 100, depending upon the options and configuration of the PC itself. For example, a program may be used to control the overall functioning of VCC 100, in which case cable 134 and connector 136 may represent a serial communication port such as RS-232. If the PC is more sophisticated, and includes hardware and/or software for the generation or display of video-related information, the system may be used to develop outgoing video programming, receive incoming video programming, or both. This would be possible, for example, if PC 132 were equipped with "multi-media" type options, in which case signal line 134 and connector 136 may represent a higher bandwidth type of link such as an SCSI interface.

If a location is intended only for the generation of outgoing video programming, that site may not be required to include a device or devices to display such programming. Likewise, a site may be dedicated to the receipt of video programming only, in which case only input means and a display device would be required, thus foregoing the need for a source of outgoing video programming. Commonly, however, a typical VCC installation would include both a source of outgoing video information and means to receive and display incoming video information to facilitate interactive communications.

SCA VIDEO BROADCASTING

Figure 2:
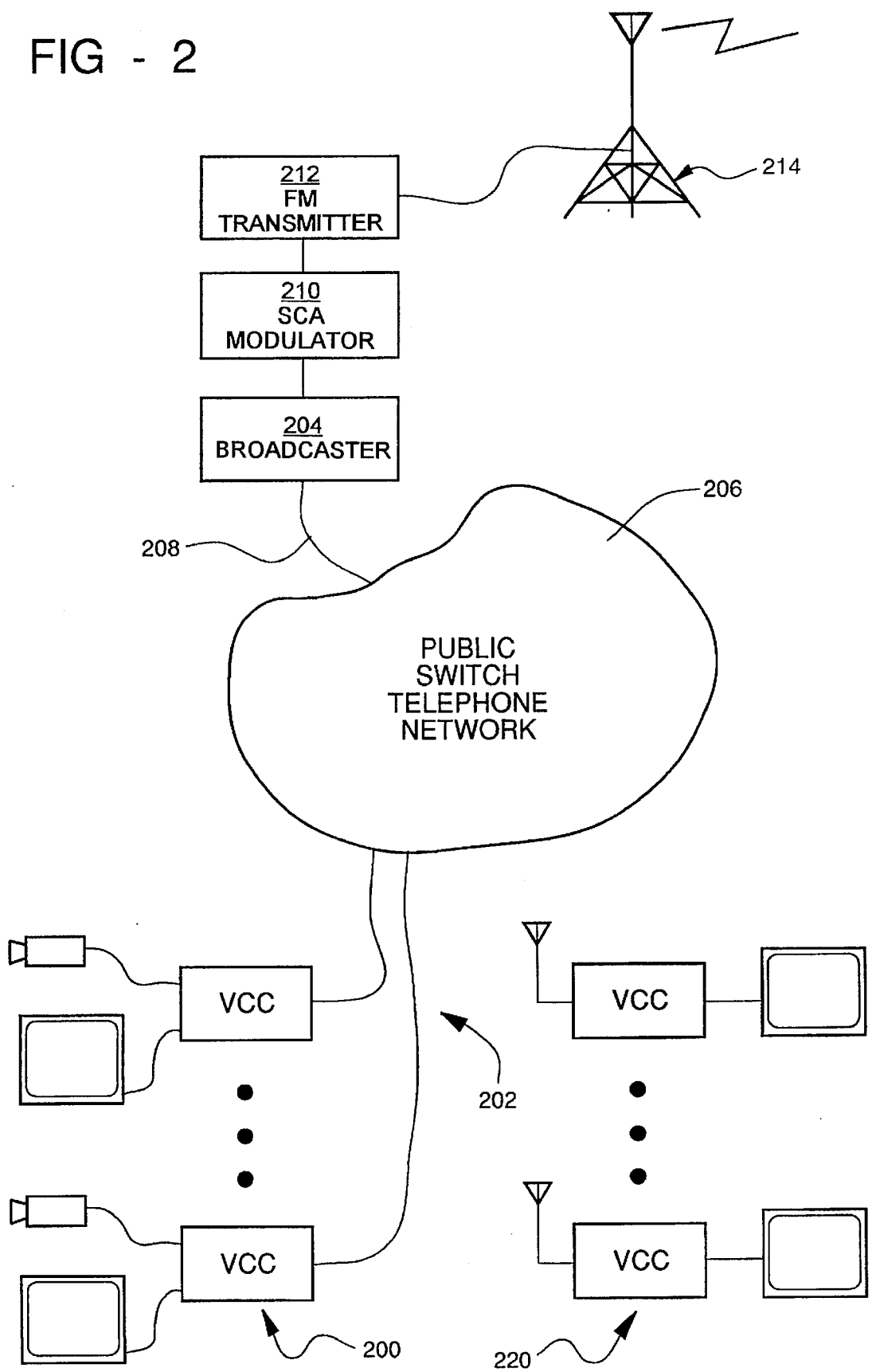
FIG. 2 is a block diagram which illustrates how the video communication controller may be used for SCA video broadcasting.

Now making reference to FIG. 2, a plurality of video program providers, depicted generally at 200, each equipped with a VCC module, produce video programs and transfer them, in digitally compressed form, over voice-grade telephone lines, ISDN fiber-optic links, or cable-television networks, shown generally at 202 into the public switch telephone network 206 ("PSTN").

A video program broadcaster, shown generally at 204, receives programs from the providers through the PSTN via line 208. The video programs received by the providers are preferably modulated onto a sub-carrier of a commercial FM frequency. In accordance with FCC regulations, the standard band width for FM transmissions is 200 kHz, with one-half of that being assigned to the signal carrier, and the other half being used for channel separation. Within the 100 kHz signal band width, stereophonic audio broadcasting consumes the lower 50 kHz, leaving the higher 50 kHz available for other purposes. One such purpose already sanctioned by FCC is the use of SCA (subsidized communication authority) types of transmissions which require dedicated modulation and de-modulation equipment.

Three sub-carriers have been defined as being least likely to interfere with adjacent channels. These three frequencies are 57, 67 and 92 kHz. Of these, the 57 kHz sub-carrier is too close to the audio band and its relatively low band with limits its use to low speed devices such as paging services. For digital data transmissions, a bit rate of 9,600 baud will require at least a 10 kHz band with, with 5 kHz on either side of the center frequency. With a baud rate of 14,400 bps, a 12–18 kHz band with will be needed, with 6–9 kHz on either side.

To support sufficiently high-quality viewing, a video program requires about 16 frames per second. Due to evolving compression technology, narrow band media such as regular copper telephone wires are capable of supporting 7.5 frames per second at a 9600 baud rate, or 10 frames per second at a baud rate of 14,400 bits per second. With an FM sub-carrier capable of supporting higher a bandwidth, and with the continuing evolution of data modulation and compression technologies, frame rates higher than 20 frames per second are achievable.

Continuing the reference to FIG. 2, once modulated onto an RF sub-carrier by SCA generator 210, the modulated signal is then delivered to an FM exciter 212 and broadcast via antenna 214. A plurality of video program receivers, depicted generally at 220, are each equipped with a VCC having an antenna and tuner to receive the SCA-modulated broadcast, decompress the video material, and display the material on their attached television monitors. Ordinarily, audio is transmitted along with the video information, or, within a subcarrier channel, the audio signal and video signal could be frequency division multiplexed (FDM) and still maintain an bandwidth in the 20-K range.

In order to maximize data throughput, an alternative embodiment is described wherein multiple frequencies or multiple subcarriers of a single frequency may be utilized during the radio transmission of the video program material, each frequency or subcarrier being used to carry a portion of the program. For example, in a preferred arrangement of this alternative embodiment, three SCA subcarriers may be used for the simultaneous transmission of the video material, with the lowest frequency subcarrier being used for audio information and two higher-frequency subcarriers being used to carry the video information. Preferably, an FCC-authorized 57 Khz subcarrier may be used for the audio portion of the program, with the video information being split between a 67 kHz and 92 kHz subcarrier, both of which are also FCC-authorized. The video image may be split in any manner conducive to subsequent reconstruction, including vertically, horizontally or on an interlace fashion or any other technique concerning luminance, chrominance, and so forth.

With such a multiplexing/demultiplexing approach to the RF transmission, various data paths and operational priorities are possible with respect to the overall system. For example, given a high enough bandwidth between the program provider and the broadcast facility, video program may be relayed in tact from the provider and split for transmission over the multiple frequencies or side bands at the location of the broadcast facility. Alternatively, if a lower bandwidth medium is used between the program provider and the broadcast facility, or if higher resolution is desired for a given bandwidth, the program may be divided up at the location of the program provider, and relayed over separate channels to the broadcast facility, where the information received over the separate channels may be received and rebroadcast over a respective frequency or subcarrier without modifying the technique used for program division or, the segments relayed by the program provider may be combined or further divided in accordance with RF transmission capabilities or limitations.

Regardless of where a program division takes place, the location of digitization and/or compression facilities may vary in accordance with the overall configuration, capability and availability of algorithms, transmission media types, and so forth. For example, the program provider may use two telephone lines, one with non-digitized audio information and the other with digitized, compressed video information. Upon receipt at the broadcast facility, the audio information may be digitized and transmitted over one or more frequencies or subcarriers, whether or not in compressed form. The received video information may be transmitted directly over a different frequency or subcarrier, or further divided so as to use two subcarriers of a single frequency, etc. Moreover, regardless of where channel separation may take place, the program material may be compressed then divided, or divided then compressed, in accordance with transmission characteristics, algorithms and so forth. For example, in the event that special algorithms are available and dedicated to audio and/or video information, it may be advantageous to first separate the program then compress to take advantage of these more specialized algorithms. On the other hand, if compression of the entire program including audio and video portions results in the lowest data rate, it may be more attractive to first compress the entire program then separate the digital information or broadcast along separate channels, frequencies or side bands. In keeping with the present invention, all that is necessary is that a program recipient be able to reconstruct and view the video program, in light of any channel separation, digitization, compression or encryption used.

MODULE IMPLEMENTATION

Figure 3:
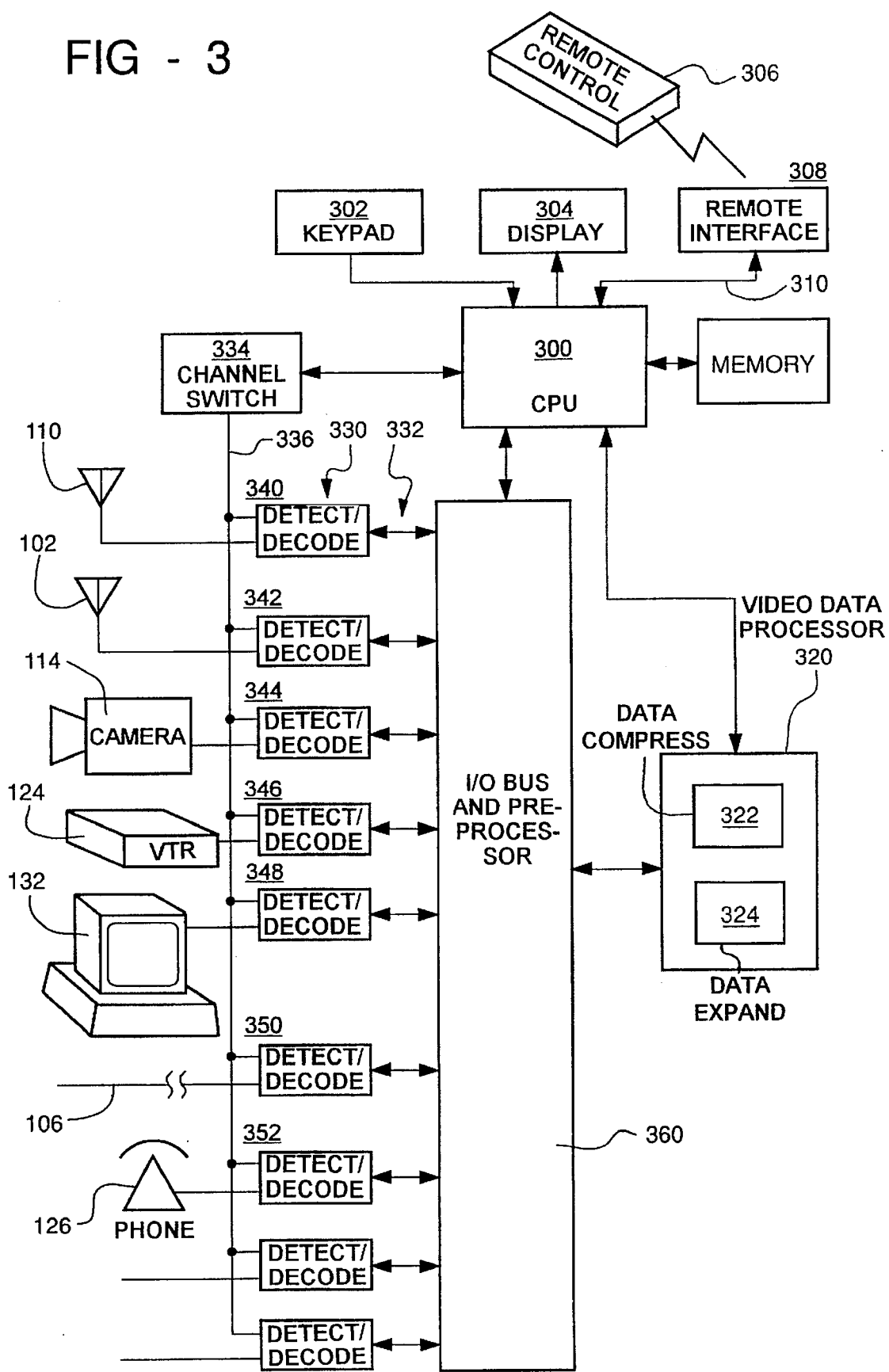
FIG. 3 is a block diagram of subsystems contained within the video communication controller.

Turning now to FIG. 3, a functional block diagram of the VCC is provided. A central processing unit 300, preferably a microprocessor or micro-controller of conventional design, receives operator instructions from switches on keypad 302, and displays the status and operation of the system via indicators on display 304. These indicators may be in the form of discrete emitters initiated with labelled functions, or a more sophisticated alphanumeric-type of display may be used. In the event that a personal computer is utilized as a control device, the PC itself may eliminate the requirement for separate operator input and output devices. Optionally, a remote controller 306 may be used in conjunction with a remote control interface 308 operatively connected to CPU 300 via signal lines 310.

A video data processing module 320 consists of two sub-systems, a data compression unit 322 and a data expansion unit 324. As such, module 320 could itself be electronically very sophisticated, including its own micro computer along with analog-to-digital and digital-to-analog circuitry. The major function of module 320 is to compress the data representative of outgoing video program information at as high a possible compression ratio using commercially available or proprietary algorithms. Preferably, module 320 or memory devices associated with the module may be replaceable, thus allowing the latest, more advanced data compression/expansion algorithm to be implemented.

An I/O bus and pre-processor module 360 is used to physically route income and/or outgoing signals into and out of video data processing module 320. The I/O bus and pre-processor module 360 interfaces to a plurality of signal detectors and decoders indicated generally by blocks 330 via associated I/O paths 332. In the event that an incoming signal has not been digitally compressed or for some other reason does not require the functions provided by processing module 320, that signal may immediately be routed to a designated peripheral device or display for processing. For instance, a conventional television signal may be output directly to a monitor.

As shown in FIG. 3, interface modules 330 connected to the various peripheral devices are also interfaced to a channel switch module 334, the function of which is to control the traffic of input and output operations in accordance with priority under CPU and operator control. In the event of competition for these sources, channel switch module 334 communicates with CPU 300 over signal path 336 in order to determine the proper sequence or alternative configuration.

INPUT/OUTPUT MODULES

The modules 330 in FIG. 3 include a TV signal detector and decoder 340 which connects to a conventional television antenna 110. Since conventional television signals ordinarily will not require further processing within the VCC, block 340 may be implemented as a simple switching function under the control of channel switch module 334.

FM SCA detector and decoder 342 connects to an RF antenna 102. Alternatively, antennas 110 and 102 may make use of the same antenna through the use of a signal splitter to modules 340 and 342. The function of module 342 is to separate and decode digital data from the FM sub-carrier. One technique for performing this detecting and decoding is described in my issued U.S. Pat. No. 4,991,201, though other approaches are possible. If the VCC is equipped with encryption and decryption, module 342 will first test the detected digital data to see if this particular VCC has been addressed. If so, the module will proceed to perform the required video decoding procedures. A signal will also be sent to channel switch module 334 to ensure that overall system priorities are met.

TV signal detector and decoder module 344 interfaces to video camera 114 a separate TV signal and decoder module 346 may be provided for connection to a video tape recorder 124 or, alternatively, camera 114 and VTR 124 may be connected to a single input, as shown in FIG. 1, assuming there is no resource competition. Video signal detector and decoder module 348 receives inputs from a personal computer system 132. As mentioned, this path from the PC may be either a serial or a parallel port, depending on the use intended for the personal computer in conjunction with the VCC system. Assuming the personal computer is equipped with multi-media or video-type capabilities, the function of module 348 is to decode and convert video signals received from the VC into a binary file which may be stored on disk or, in reverse direction to down load such a file so that it may be displayed on the monitor of the PC system.

Video signal detector and line interface 350 interfaces to a conventional telephone line 106 through a connector 108, as shown in FIG. 1. Preferably, this connector is a standard RJ-11 type of telephone interface, though, depending upon the availability of media, the use of a local switching apparatus, and so forth, any type of connector may be utilized. Completing the reference to module 330, phone line interface 352 interfaces to a telephone set 126 so that conventional voice communications dialing functions are supported.

When an incoming telephone call is received, module 350, in conjunction with I/O bus and pre-processor module 360 and CPU 300 tests the call to determine if it is video-based. If so, through control of CPU 300, the information will be output to a display device, assuming no privacy mechanisms are in place. If the system is unattended, the CPU may be programmed to take a video-based call automatically, in which case the video information will be stored either on video tape associated with VTR 124 or on disk associated with personal computer 132. Alternatively, if the television is in use, the system may automatically generate a picture-in-picture signal so that an operator may watch a program while referring to the incoming call.

Since the VCC system will ordinarily be equipped with video compression and expansion for outgoing and incoming programming, respectively, the system may advantageously be used as a picture phone without the need for RF broadcasting. With such a configuration, each party uses a camera to transmit their image and a monitor to view the other party. With picture-in-picture capabilities, a preview of a party's outcoming image may be displayed in a window of the same screen showing the other party. Alternatively, with a sufficiently adapted personal computer, the self-image may be displayed on the computer monitor while the image of the other party is displayed on the TV screen.

In operation, the calling party will preview his/her image as described above and, when found to be acceptable, place the video call. At the receiving end, the other party's VCC will accept the incoming call, detect if it's video-based, either with a sound or a visual indicator of some kind. In a normal mode, the telephone may be used for conventional voice conversation, but if the system is in a video mode, the calling party's image will be decompressed and displayed on a monitor resident at the recipient's location. In order to avoid unexpected or embarrassing video calls, an additional switch may alternatively be provided to insure that a recipient desires to receive and/or transmit video images.

VIDEO TELECONFERENCING

Figure 4:
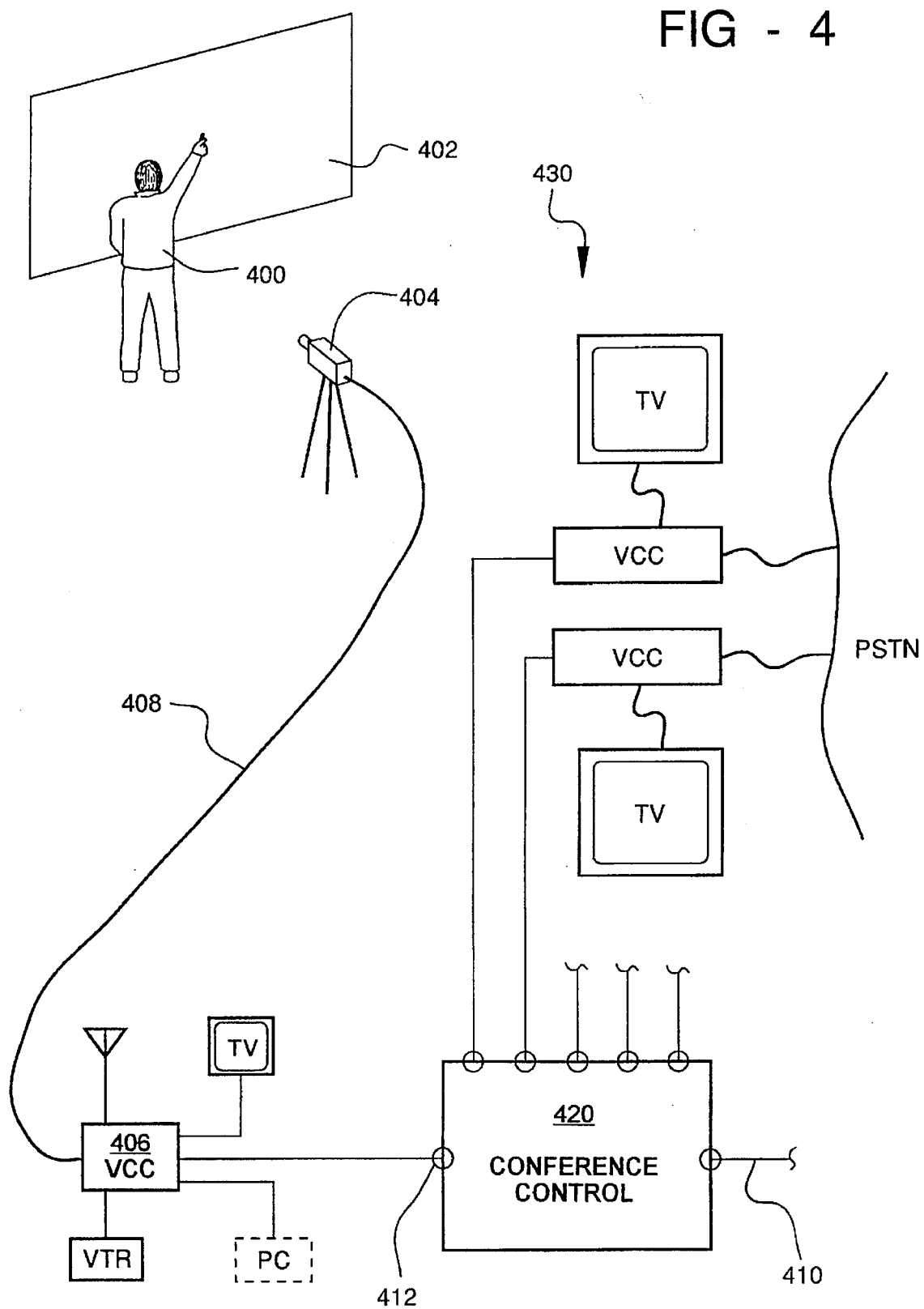
FIG. 4 is a drawing which illustrates how a video program may be segmented at a program provider location then reassembled at a service center.

FIG. 4 shows a block diagram of how multiple VCC units may be interconnected so as to provide an interactive classroom-type of environment via teleconferencing. Broadly speaking, an instructor is capable-of communicating with a plurality of students, all parties be resident at different locations and all being equipped with a VCC unit. Additionally, however, a conference control module ("CCM") is added at the instructor location to receive incoming calls from students and derange the screen format sent to the RF transmitter and associated service center so that all of the students associated with the network may view instructor-student interactions.

Referencing FIG. 4, an instructor 400 advantageously using a blackboard or marker board 402 is recorded by camera 404 and this image relayed to a first VCC 406 via line 408. The image of the instructor is compressed by VCC 406 and output to CCM 420 through connection point 412 where it may be joined with one or more images of students from on-site VCCs 430, having received these images through the PSTN. One function of CCM 420 is to arrange the images of the instructor and those from participating students into a multiple windows type of format, then compress this integrated image and transmit it to a service center through telephone line 410.

I claim:

1. A method of delivering a video program, comprising the steps of:

generating a video program;

segmenting said video program;

broadcasting said video program on a plurality of FM subcarriers, at least one of said FM subcarriers being an SCA-authorized FM subcarrier, each of said subcarriers being used to transmit a different segment of the video program;

recovering and reassembling said video program segments from said subcarriers at a remote location; and viewing said video program on a display device.

2. The method of claim 1, wherein at least one of said FM subcarrier is an SCA-authorized FM subcarrier.

3. The method of claim 1, wherein said video program includes audio and video portions, and wherein different FM subcarriers are used to carry the audio and video portions.

4. The method of claim 1, further including the steps of digitally compressing one or more of said program segments prior to broadcasting and decompressing said digitally compressed segments prior to reassembling said video program at said remote location.

5. The method of claim 2, wherein said video program includes audio and video portions, and wherein the audio portion is carried on the 57 kHz SCA sideband and the video portion is multiplexed over the 67 kHz and 92 kHz SCA side bands.

6. The method of claim 4, including the step of digitally compressing at least a portion of the video program, then dividing said portion into said segments.

7. The method of claim 4, including the step of first dividing the program into said segments, then separately digitally compressing one or more of said segments.

8. The method of claim 4, wherein said video program includes audio and video portions, and the step of digitally compressing one or more segments of said video program includes digitally compressing only segments associated with the video portion of said program.

9. A video delivery system, comprising:
   a source facility, including:
      an input to receive a video signal including an audio portion and a video portion,
      a data compressor to receive the video signal and generate a digitally compressed version thereof, and
      an output telephone interface to receive the compressed video signal and output the signal over at least one phone line;
   a broadcast facility, including:
      an input telephone interface to receive the digitally compressed video signal from the source facility, and
      an RF transmitter to receive the digitally compressed video signal from the input telephone interface and modulate and transmit the digitally compressed video signal onto one or more sidebands of an FM carrier; and
   a receiving facility, including:
      an RF receiver to receive and demodulate the video signal from the FM carrier transmitted by the broadcast facility,
      a data decompressor to receive the demodulated signal from the RF receiver and decompress the video signal, and
      an output to which a display device may be attached to view the demodulated, decompressed video program.

10. The video delivery system of claim 9, further including a signal separator operative to receive the video signal and divide it into a plurality of segments;
   the broadcast facility further including means for receiving each segment and transmitting each segment onto a different FM subcarrier; and
   the receiving facility further including a signal combiner operative to receive and join the segments so as to reconstruct the video signal for display purposes.

11. The video delivery system of claim 10, wherein the signal separator is located at the broadcast facility.

12. The video delivery system of claim 10, wherein the signal separator is located at the source facility.

13. The video delivery system of claim 12, wherein the video signal is first digitally compressed by the data compressor prior to being segmentized by the signal separator.

14. The video delivery system of claim 12, wherein the video signal is first segmentized by the signal separator prior to being digitally compressed by the data compressor.

15. The video delivery system of claim 10 wherein different FM subcarriers are used to carry the audio portion and the video portion of the video program.

16. The video delivery system of claim 15 wherein different FM subcarriers are used to carry different segments of the video portion of the video program.

17. The video delivery system of claim 16, wherein the portions of the video program are carried on different SCA side bands at a single FM frequency with the audio portion being carried on the 57 kHz sideband and the video portion being multiplexed over the 67 kHz and 92 kHz side bands.

* * * * *